Feb. 2, 1971 MASAO KAMIMURA ETAL 3,560,970
OBSTACLE DETECTOR UTILIZING WAVEGUIDE
Filed Sept. 13, 1968 3 Sheets-Sheet 1
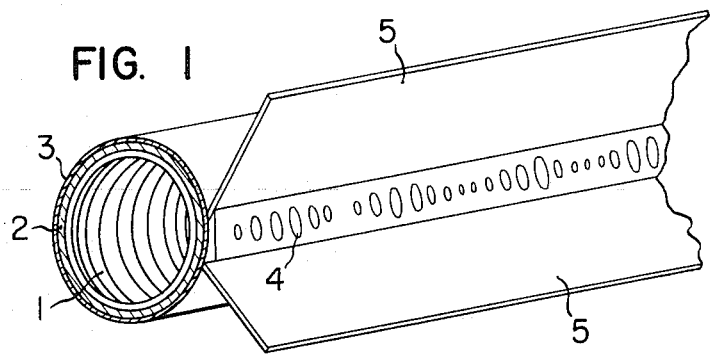
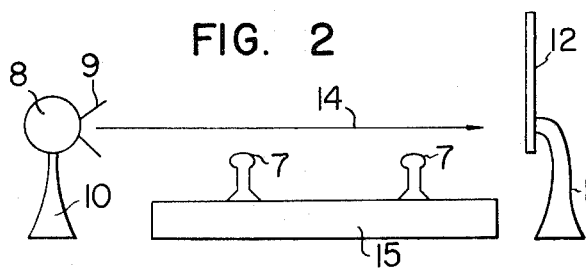
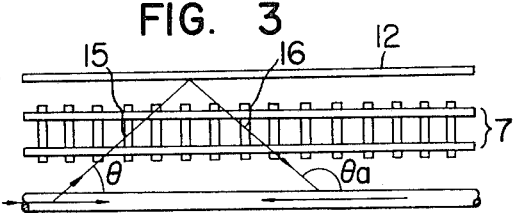
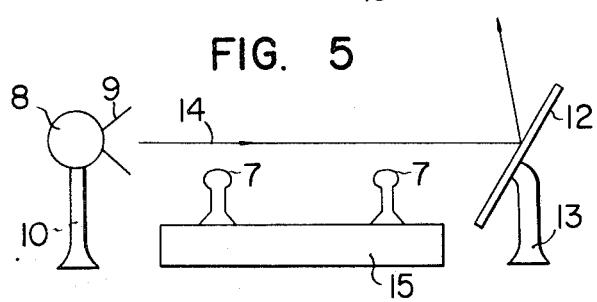
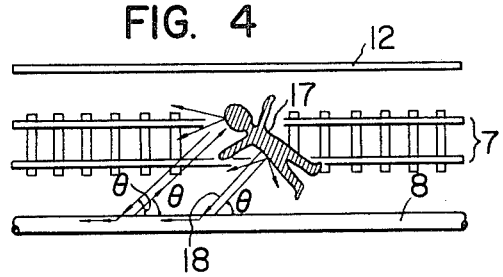
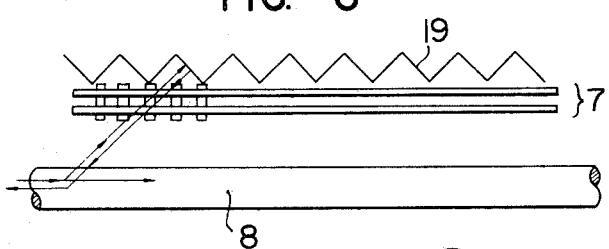
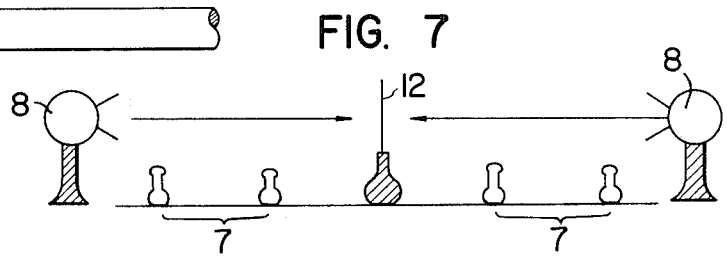
INVENTORS:
Masao Kamimura and
BY Mitsuru Watanabe,
Marmorek & Bierman,
Their Attorneys.

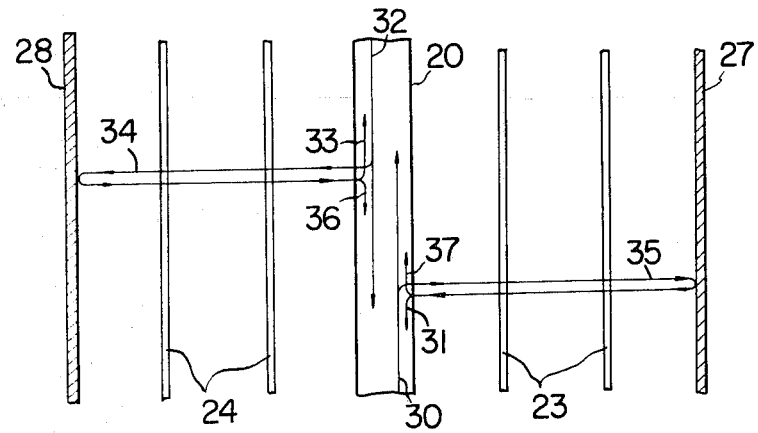
FIG. 8
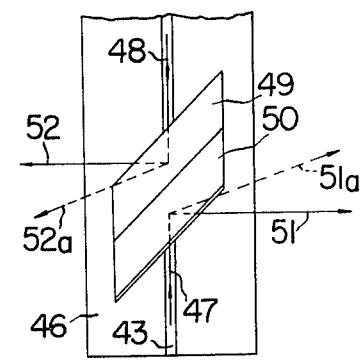
FIG. 11(a)
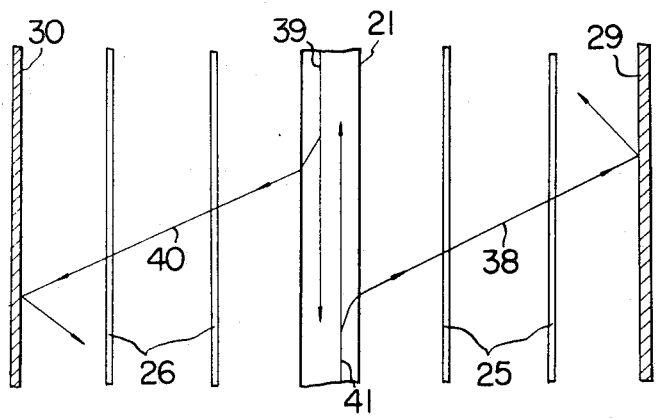
FIG. 9
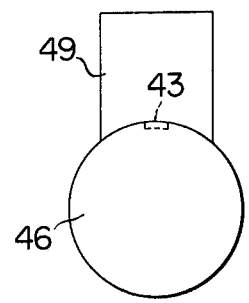
FIG. 11(b)
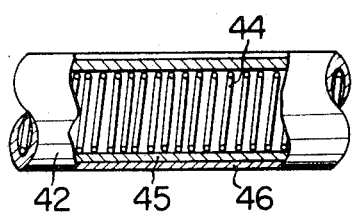 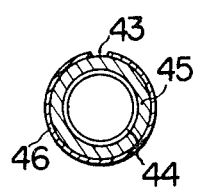
FIG. 10(a)   FIG. 10(b)
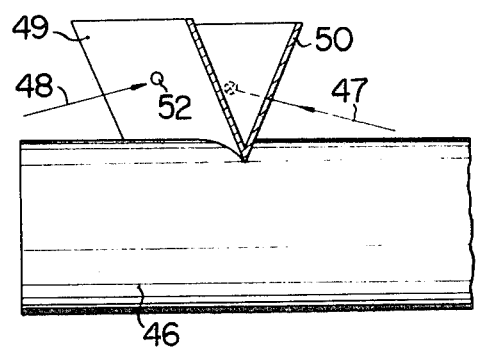
FIG. 11(c)
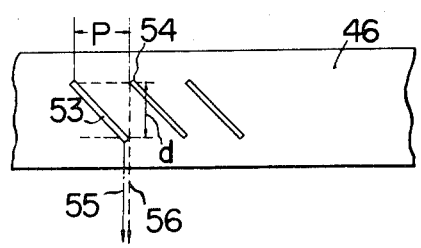
FIG. 12

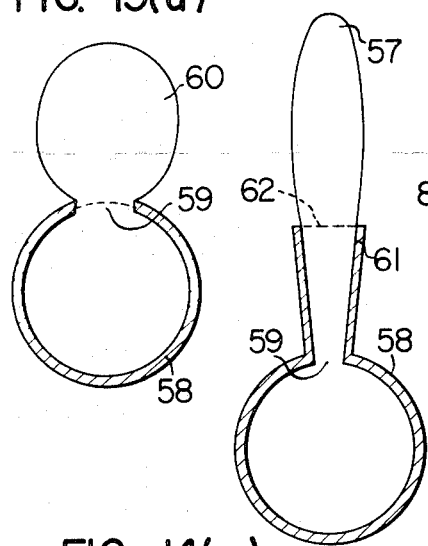
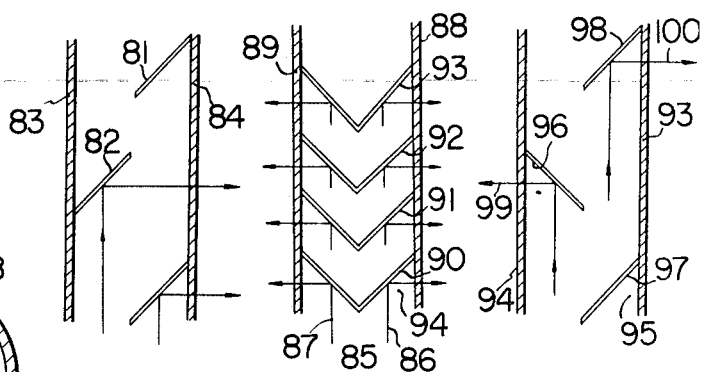
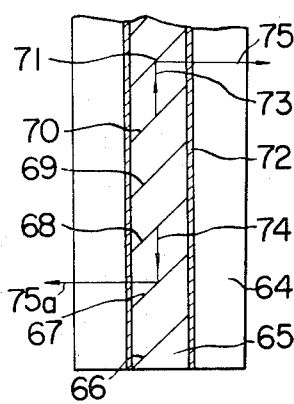
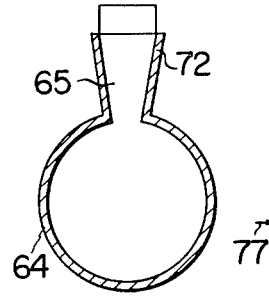
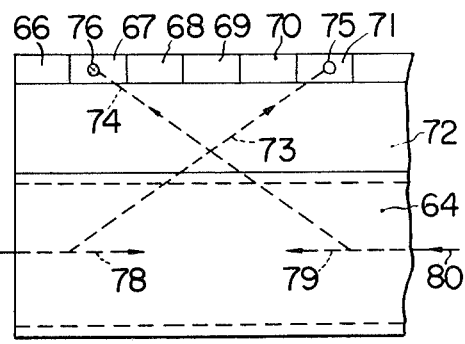
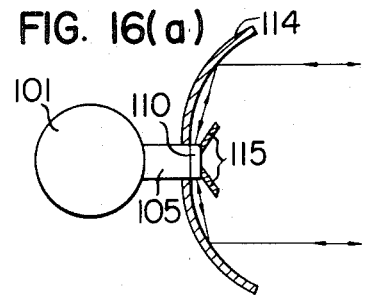
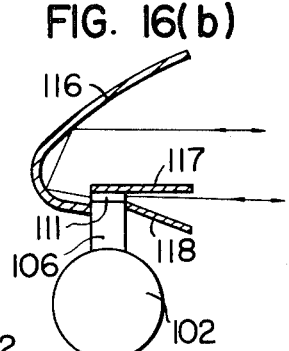
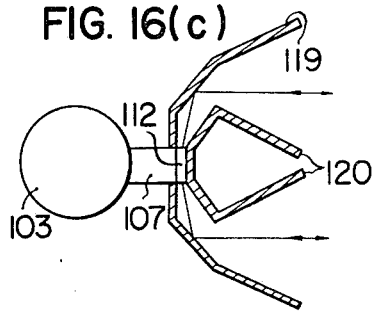
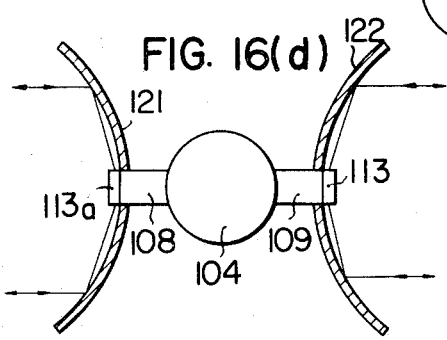

3,560,970
OBSTACLE DETECTOR UTILIZING WAVEGUIDE
Masao Kamimura and Mitsuru Watanabe, Tokyo-to, Japan, assignors to Kabushiki Kaisha Hitachi Seisakusho, Tokyo-to, Japan, a joint-stock company of Japan
Continuation-in-part of application Ser. No. 449,556, Apr. 20, 1965. This application Sept. 13, 1968, Ser. No. 759,712
Claims priority, application Japan, Apr. 30, 1964, 39/24,227, 39/24,228
Int. Cl. H01q *13/22;* B61l *23/00;* G01s *9/02*
U.S. Cl. 343—5                                                9 Claims

ABSTRACT OF THE DISCLOSURE

An obstacle detecting apparatus comprising a leaky waveguide having beam directivity and leakage aperture installed along one side of the path, electromagnetic waves being supplied through the waveguide, caused to leak out of the leakage aperture, and reflected when they strike any obstacle in the path and re-enter the waveguide through the leakage aperture to be sensed by an appropriate means to detect the presence and position of the obstacle.

---

This is a continuation-in-part application of our co-pending application Ser. No. 449,556, filed Apr. 20, 1965, entitled "Obstacle Detection System and Leaky Waveguide Therefor" and now abandoned.

This invention relates to an apparatus for detection of obstacles in the paths of trackways for travel of moving devices such as rolling stock of railways.

As the speeds of moving devices such as railway trains increase, the distance required for braking these devices to stop also increases until, eventually, this distance exceeds the limit visible to the human eye. It is generally considered that the driver of a railway train can normally recognize obstacles at a distance of approximately one kilometer ahead of the train. However, the braking distance of railway trains traveling at 200 or more kilometers per hour is of the order of 3 kilometers, whereby it is not feasible in this age to rely on the naked eye for detection of obstacles in the trackway. Accordingly, it is necessary to provide automatic means to detect obstacles and apply brakes in a manner to prevent accidents.

One device which is naturally considered for detecting obstacles for the above purpose is the radar type of device. However, a radar wave can be utilized to detect only obstacles which are directly in the forward direction and is of little value in applications to pathways having numerous curves as in the case of a railway. Furthermore, by a radar system, it is difficult to detect obstacles in the entire region in the vicinity of the railway tracks. Moreover, since a radar system is essentially based on the utilization of reflected waves, it has disadvantages such as great difficulty in detecting obstacles composed of materials which readily absorb electromagnetic waves.

In addition, there has been proposed a system, wherein two leaky waveguides are provided on the two sides of one railway trackway; the leakage electromagnetic wave from one of the leaky waveguides is radiated to the other leaky waveguide; and obstacles are detected from the variation in the transmitted quantity of the leakage electromagnetic wave. This system, however, requires a total of four leaky waveguides for a double-track railway, and since leaky waveguides are considerably expensive, it is difficult to reduce this system to a practical form.

It is therefore a prime object of the invention to provide an improved system for detecting obstacles in the path of travelling objects, which makes possible the detection of obstacles on a single-track railway by means of a single leaky waveguide and on a double-track railway by means of not more than two leaky waveguides and preferably by means of only one leaky waveguide, thereby reducing the cost of the apparatus.

It is another object of the present invention to enable the detection of obstacles on single-track railway or a double-track railway by means of a single leaky waveguide, thereby to reduce cost of the detection system. Since a leaky waveguide is used in the system of the present invention, the directivity and transmission loss of the leakage electromagnetic wave present problems.

It is still another object of the invention to provide a suitable construction for leaky slots in the leaky waveguide or of reflectors provided for the leaky waveguide whereby any desired directivity almost independent of the frequency can be obtained, and, by effectively using a radiated electromagnetic wave beam, transmission loss can be reduced.

The nature, principle, and details of the invention will be more clearly apparent from the following detailed description of the principle of the invention and preferred embodiments thereof, when read in conjunction with the accompanying drawings in which like parts are designated by like reference numerals and characters and in which:

FIG. 1 is a fragmentary perspective view showing one example of a leaky waveguide suitable for use in the system according to the present invention;

FIGS. 2 through 9, inclusive, are simplified schematic diagrams indicating the principle and operation of the invention as exemplified by basic embodiments thereof;

FIGS. 10(a) and 10(b) and 11(a)–11(c) show an upper plan view, end and side elevational views, and vertical and transverse sectional views of a practical embodiment of the leaky waveguide according to the invention;

FIG. 12 is a fragmentary, simplified plan view for an explanation of the principle of a waveguide to be used according to the invention;

FIGS. 13(a) and 13(b) consist of cross-sectional views showing the radiation patterns of leakage waves for an explanation of a principle of waveguides according to the invention;

FIGS. 14(a), 14(b) and 14(c) show respectively an upper plan view, a cross-sectional view and a side elevational view of still another embodiment of the leaky waveguide of the invention;

FIGS. 15(a) to 15(c) consist of fragmentary plan views, in section, showing parts of the leaky waveguide according to the invention; and FIGS. (16a) to 16(d) consist of cross-sectional views showing examples of the essential construction of an electromagnetic wave projector for the leaky waveguide of the invention.

Referring to FIG. 1 showing one example of a leaky waveguide suitable for use in the system of the present invention, reference numeral 1 designates a helical leaky waveguide consisting essentially of a space winding of one conductor or a parallel winding of several conductors, provided with dielectric materials 2, serving both as reinforcement and as a matching layer, and with an enveloping metallic shield 3 having therethrough slots 4, the sizes of which may be varied to vary the quantity of leakage of electromagnetic waves. Also, by varying the spacing between the slots or by varying their sizes in periodic pattern, the angle of the leakage wave beam relative to the waveguide axis can be varied. The waveguide structure is further provided with an electromagnetic horn 5 for concentrating the electromagnetic beam within a horizontal plane.

A basic embodiment of the invention is shown in FIG. 2, which is a simplified cross-sectional view in the direction of railway track 7 supported on ties (sleepers) 15. On one side of the trackway 7, there is provided a leaky waveguide 8 having an electromagnetic horn 9 and supported on a support 10. On the opposite side of the trackway 7, there is provided a metallic reflector 12 for reflecting electromagnetic waves from the leaky waveguide 8, the reflector being mounted on a support 13. This reflector may, of course, have a curved reflection surface so as to focus the reflected electromagnetic waves in the plane of the slot in the leaky waveguide.

When an electromagnetic wave is fed into the leaky waveguide 8 from a source (not shown) for generating electromagnetic waves, the leakage wave traverses the trackway 7 horizontally as indicated by arrow 14 and is projected onto the reflector 12, by which the wave is reflected.

The behavior of the reflected wave in this case is indicated in FIG. 3, which is a plan view of one example of arrangement of parts according to the invention. When an electromagnetic wave is transmitted from a stationary ground device, a moving train, or some other means (not shown) to the leaky waveguide 8, a leakage wave 15 is radiated outwardly at an angle $\theta$, is reflected by the reflector 12, and returns to the leaky waveguide 8. However, the wave returns at an angle $\theta_a = \pi - \theta$ and it can no longer return to the direction of the transmission generator.

If there is an obstacle 17 on the trackway as shown in FIG. 4, the obstacle 17 normally reflects the projected electromagnetic wave in various directions. Of these waves so reflected, there will be one reflected wave 18 which will reenter the leaky waveguide 8 at an incident angle which is equal to the angle $\theta$ of the leakage wave.

The re-entrant incident wave constitutes a signal which may be detected in any conventional manner, for example by feeding it into a Braun tube (C.R.T.) for indication just as in the radar and sonar, so that the presence and position of an obstacle on the trackway will be indicated by variation of the signal. (In particular, scope such as oscillator 64 shown in FIG. 4 of Ford et al. (U.S. Pat. 2,648,839) can be effectively used. In this case, the abscissa is to indicate the position of an obstacle and the ordinate represent magnitude of signal.)

FIG. 5 is a simplified cross-sectional view in the direction of a trackway showing a modified embodiment of the invention wherein the reflector, which in the embodiment previously described directly faces the leaky waveguide 8, is inclined so as to face obliquely in the upward direction. Consequently, the leakage wave 14 is reflected by the reflector 12 in a direction other than the direction towards the leaky waveguide 8. In this case also, if there is an obstacle on the trackway 7, the obstacle can be detected in a similar manner as in the case illustrated in FIG. 4.

In another embodiment of the invention as shown in FIG. 6, the system is so adapted that reflected waves are normally received by the leaky waveguide 8 in a constant manner from a reflector device 19; the presence of an obstacle results in a drop in the level of the reflected wave received and this drop is utilized to detect the presence of the obstacle.

FIG. 6 is a plan view showing, for the sake of simplicity, only the leaky waveguide 8 and the reflector device 19. The reflector device 19 is in the form of a staggered reflector plate, the staggered surfaces of which are alternatively parallel with the direction of the leakage wave and plane thereto, each section of the staggered surface parallel with the direction of the leakage wave being equal in length to an integral multiple of the wavelength of the leakage wave, so that when the electromagnetic wave is in the form of a short pulse, the reflection from each section plane to the direction of the leakage wave remains in phase with each other reflection so that the reflected wave entering the leaky waveguide takes the form of a continuous wave rather than a short pulse. If there is an obstacle on the trackway, however, the level of the reflected wave will drop, and the strength of the received wave after the time interval required for travel to and from the obstacle, subsequent to emission of pulses, will consequently drop. Variation of the signal constituted by the received wave indicates the presence and position of an obstacle.

In the case of a double-track railway, it is possible to use a common reflector for the two trackways as indicated in FIG. 7. The example shown therein is self-explanatory, but it should be mentioned that FIG. 7 shows the case where a vertical reflector plate is used.

With the above described arrangement and construction of parts, obstacles can be readily detected. Moreover, since the metallic reflectors do not require a very high degree of precision, they can be produced at low cost and, in addition, can be utilized to serve as part of the railway security fencing.

Preferred embodiments of the invention use a single leaky waveguide for the detection of obstacles on either side or both tracks of a double-track railway as will be described hereinafter.

Referring to FIGS. 8 and 9 illustrating embodiments of the invention, waveguides 20 and 21 are disposed between double trackways 23 and 24 and double trackways 25 and 26, respectively, and reflectors 27 and 28 and reflectors 29 and 30 are disposed on opposite sides of the respective double trackways.

A propagated wave passing through either waveguide in the downward direction (as viewed in FIGS. 8 and 9) leaks only toward the lefthand trackway due to the fact that a particular form of leaky waveguide, to be described hereinafter, is used. A propagated wave travelling in the upward direction (as viewed in the drawing) leaks only toward the right-hand trackway. In the case where the electromagnetic waves in opposite directions mutually interfere, electromagnetic waves of different frequencies may be used for the two directions, or reflectors of a form to be described hereinafter may be used.

FIG. 8 illustrates the case where a steady signal is obtained if there is no obstacle present on the track and where an obstacle will produce a variation in this signal, while FIG. 9 illustrates the case where no signal is obtained unless an obstacle is present on the track. In either case, by the use of a leaky waveguide of a construction as described hereinafter, it is possible to detect obstacles effectively with a single waveguide used for both trackways.

The waveguide 20 has directivity, so that a part 35 of a transmission wave 30 arriving from below traverses over the right-hand trackway (as viewed in FIG. 8), and is reflected perpendicularly by the reflector plate 27 to return by the same path and reenter the waveguide, where it splits into two parts 31 and 37 one of which becomes a received wave 31 which is sent in the direction towards the transmission generator. A part 34 of a transmission wave 32 arriving from above is radiated only towards the left-hand trackway (as viewed in FIG. 8) and, if there is no obstacle, it is reflected by the reflector plate 28 to re-enter the waveguide, where it splits into two parts 33 and 36 one of which becomes a received wave 33 which is returned to the other transmission generator.

In the arrangement shown in FIG. 9, a single waveguide of almost the same construction as that mentioned above is used, to obtain the same effect with respect to the two tracks 25 and 26 as described above with reference to FIG. 3. A part of an upwardly traveling transmission wave 41 is directed diagonally as a leakage wave 38, which, when there is no obstacle, does not return but traverses the right-hand trackway and, upon striking the opposed reflector plate 29, is scattered and dissipated into space. The same is true for that part of a downwardly traveling transmission wave 39 which is directed diagonally as a leakage wave 40. If there is an obstacle, reflected waves are produced and detected by the same principle as described with reference to FIGS. 3 and 4.

The present invention, in still another aspect thereof, further provides specific construction of waveguides necessary for the practice of the invention as described with reference to FIGS. 8 and 9. While the waveguide construction shown in FIG. 1 is suitable in principle, it is accompanied by certain difficulties in actual practice. For example, since the sizes and positions of the slots in the construction shown in FIG. 1 are varied, the fabrication of the waveguide is complicated. Furthermore, the leakage quantity is small. Accordingly, a suitable construction is one which facilitates leakage and, moreover, affords changing of the directions of leakage waves toward desired directions as illustrated by the example shown in FIGS. 10(a), 10(b), 11(a), 11(b), and 11(c).

Referring to FIGS. 10(a) and 10(b) which show respectively a side view, partly in longitudinal section, and a cross-section of the example waveguide (in which views deflectors for the waveguide are not shown), a layer 45 of, for example, a synthetic plastic material, is formed around a conductor wire 44 which is wound in a helical form with spacing between each turn so as to form a leaky waveguide. Around this leaky waveguide, there is further formed a conductor layer 46 provided in one part thereof with a narrow slit 43, whereby a slit waveguide is formed. While the slit 43 may be repeated at regular intervals rather than continuous, it extends in only a single axial direction.

FIGS. 11(a), 11(b) and 11(c) show respectively a plan view, an end view, and a side elevational view of the above-described waveguide provided with deflector plates. As indicated in FIG. 11(a) electromagnetic waves 47 and 48 which have leaked through the slit 43 are respectively deflected in mutually opposite directions by deflector plates 49 and 50 of V configuration disposed at a certain angle relative to the waveguide axis.

If the deflector plates are disposed at an angle of 45 degrees relative to the axis, the electromagnetic waves will be deflected perpendicularly to the axis as indicated by paths 51 and 52. At other angles, these waves will be deflected in other directions as indicated by dotted lines 51a and 52a. Thus the case where the deflector plates are disposed at 45 degrees relative to the axis, corresponds to the case illustrated in FIG. 8.

Since the electromagnetic waves leave the slit at a certain angle of inclination to the vertical plane, the deflector plates 49 and 50, strictly speaking, must be tilted relative to the vertical line in order to deflect these waves within a horizontal plane. By tilting a deflector plate away from the vertical plane by an angle equal to the said angle of inclination to the horizontal plane, the resulting beam of electromagnetic radiation can be directed in the horizontal direction. However, in cases where it is not absolutely necessary for the waves to be within a horizontal plane, a single sheet of metal plate may be simply erected in a vertical position.

In the arrangement shown in FIG. 8, curved plates may also be used as the deflector plates 27 and 28, in place of flat plates, in order to return effectively the electromagnetic waves reflected thereby to the waveguide 20. Such a construction is highly advantageous particularly in that the efficiency thereof becomes high.

In the above described examples, an electromagnetic wave for detection of obstacles which is transmitted from the other end of the leaky waveguide can be radiated in the opposite direction (toward the other trackways), only by providing deflector plates corresponding to the abovementioned deflector plates but facing in the opposite direction axially and adapted to reflect the electromagnetic wave in the opposite direction.

While the objects of the present invention can be achieved by the methods and apparatus according to the invention as described above, the performance of the system of this invention can be further improved by effective refinements in the construction of the deflector plates provided in the leaky waveguide as described hereinbelow.

In the case wherein, in a leaky waveguide as described above, the electromagnetic waves leaking out along the waveguide wall are not in phase as a whole, mutual interaction occurs, and a so-called side lobe having substantially strong energy is produced. For this reason, when such a waveguide is used as a transmission line for obstacle detection as in this invention, power loss or erroneous detection occurs in some cases.

This difficulty may be overcome, as illustrated in FIG. 12, by the use of deflector plates 53, 54, etc., with a spacing pitch $p$ in combination with a leaky slit of width $d$, where $p$ and $d$ are integral multiples of wavelength $\lambda_g$ of the electromagnetic wave, whereby the phases of the leakage electromagnetic waves controlled by the deflectors so disposed are caused to coincide. That is, when the pitch $p$ and slit width $d$ in FIG. 12 are made equal to integral multiples of the guide wavelength $\lambda_g$, the phases of the electromagnetic waves which travel in the path 56 indicated by intermittent line and in the path 55 indicated by dot-and-dash line are caused to coincide. By this construction, the inconvenience due to the aforementioned side lobe can be eliminated, and the detection performance of the system can be improved.

The leaky waveguide illustrated by the above example described with reference to FIG. 1, determines the direction of the leakage electromagnetic waves by the shape of the slots which form discontinuities in the waveguide structure and thus produce the leakage electromagnetic waves. This method of directing the leakage electromagnetic waves, although relatively efficient, still results in appreciable wastage, and the transmission losses become large. This is a great difficulty in practical use. While the examples shown in FIGS. 11(a), 11(b), 11(c) and 12 have small transmission losses, the electromagnetic waves leaking from the slit have the property of spreading in the circumferential direction, whereby there is a large quantity of ineffective leakage waves, which is undesirable for practical use.

Accordingly, in order to reduce transmission loss and to increase the quantity of effective leakage electromagnetic waves in the vicinity of the slot or slots which are provided at specific intervals in the wall of the waveguide, there may be provided a first projector for electromagnetic waves adapted to concentrate leakage waves and a second projector for electromagnetic waves adapted to change the direction of the electromagnetic waves concentrated and projected by the first projector. If necessary, a third projector may be provided. By this construction, the aforementioned difficulties can be overcome. This construction will be more clearly apparent from the following detailed description with reference to the drawings.

Referring to FIGS. 13(a) and 13(b), there are shown cross-sectional views of leaky waveguides, respectively without and with a first projector for electromagnetic waves. In the case shown in FIG. 13(a), the distribution pattern of an electromagnetic wave leaking and being radiated from the slot 59 of a waveguide 58 is as designated by reference numeral 60. In contrast, in the case as shown in FIG. 13(b) wherein a first projector 61 for electromagnetic waves is provided at the two sides of the slot 59 of the waveguide 58, the distribution pattern of the electromagnetic wave leaking and being radiated from the outlet 62 is a sharp, elongated pattern as indicated by reference numeral 57.

FIGS. 14(a), 14(b) and 14(c) are respectively plan, end, and side elevational views showing an embodiment of the leaky waveguide 64 according to the invention. This waveguide is provided with a first projector 72 having an outlet 65 for electromagnetic waves and with a series of metal plates 66, 67, 68, 69, etc., for deflecting electromagnetic waves; the plates are disposed at specific intervals, at required angles of orientation relative to the waveguide axis, in the vicinity of the outlet of the first projector 72, said metal plates constituting second electromagnetic wave deflectors.

Referring to FIG. 14(a), an electromagnetic wave 73 which has passed through the first projector 72 to the exterior is deflected by one of the deflectors 71 and is deflected to the right-hand side as indicated by line 75 in FIG. 14(a). An electromagnetic wave 74 which has entered from the opposite direction is deflected by a deflector 67 and is deflected to the left-hand side as indicated by line 75a.

Examples of other electromagnetic wave deflectors are shown in FIGS. 15(a), 15(b), and 15(c). In the example shown in FIG. 15(a), each of the deflectors shown in FIGS. 14(a), 14(b), and 14(c) are divided into two deflectors 81 and 82, etc., which are further secured in staggered arrangement at specific intervals to deflectors 83 and 84. This staggered arrangement can be realized by securing a plurality of small deflector plates directly onto the waveguide wall with a strong adhesive agent or screw, etc. Besides this, these small deflector plates can be provided in adjacent position to the leakage slots or slits. FIG. 15(b) illustrates an example, wherein deflectors 90, 91, 92, 93, etc., are so secured to deflectors 88 and 89 in such a way that electromganetic waves 86 and 87 arriving from one direction are deflected towards the respective sides. This arrangement is convenient in the case of double trackways wherein the waveguide is placed between the two trackways for simultaneous surveillance of both trackways. FIG. 15(c) illustrates a modification of the arrangement shown in FIG. 15(b) wherein deflectors 96, 97, 98, etc., are secured alternately to deflectors 94 and 95 in such a way that the portions such as 99, 100 of electromagnetic waves arriving from one direction are deflected toward the respective sides. The deflectors in the above examples are not necessarily flat plates and can be formed with curved surfaces so as to serve for the additional function of concentrating the waves.

In a further embodiment of the invention as exemplified by various forms in FIGS. 16(a), 16(b), 16(c), and 16(d), the waveguide acording to the invention as shown in FIGS. 14(a), 14(b) and 14(c) is provided further with a third eletromagnetic wave deflector consisting basically of flat or curved plates in disposition parallel to the waveguide axis for the purpose of changing the direction of electromagnetic waves deflected by the second deflector within planes perpendicular to the axis of the waveguide.

In FIGS. 16(a), 16(b), 16(c) and 16(d), respectively, waveguides 101, 102, 103, and 104 are provided with first electromagnetic wave deflectors 105, 106, 107 and 108, 109, second electromagnetic wave deflectors 110, 111, 112, and 113, 113a; and third electromagnetic wave deflectors 114, 115, 116, 117, 118, 119, 120, 121, and 122.

These waveguides have outstanding function which cannot be obtained from the conventional leaky waveguides. This particular function is now explained in reference to FIG. 16(a).

A microwave which is transmitted through the waveguide 101 in the direction from the top surface to the back surface as viewed in the drawing leaks out along the axis of the waveguide, passes through the deflector 105 (which may of course be dispensed with), and is deflected by the second deflector 110 to be directed in an upward direction to encounter the third deflector 114 where it is further deflected to a horizontal direction. In this case, the leakage wave from the second deflector 110 is not radiated in the downward direction (as viewed in the drawing). This point makes the difference from the ordinary leaky waveguide. Furthermore, incident microwave from outside (i.e., from the right-hand direction as viewed in the drawing) encounters equally the upper and lower parts of the third deflector 114, and the microwave entered from the upper part is deflected by the second deflector 110, and returns from the back surface to the top surface of the drawing through the waveguide. On the other hand, the microwave entered from the lower part is deflected by the second deflector 110, and returns from the top surface to the back surface of the drawing through the waveguide 101. The above mentioned faculty of the waveguide is one of the features of this invention, which could not be realized by the conventional waveguide.

The foregoing explanation is made with respect to only the example of FIG. 16(a), but same applies to other examples shown in FIGS. 16(b), 16(c) and 16(d).

By the construction of the leaky waveguide according to the invention as described above, the distrbution of electromagnetic waves leaking out from the waveguide is caused by the first electromagnetic wave projector to assume a sharp, elongated pattern and then deflected by second and third electromagnetic wave projectors. Accordingly, an increase in leakage efficiency which could not be attained by conventional single projectors becomes possible. We have found by actual practice that, by means of the leaky waveguide of the invention, transmission loss can be reduced to 8 db/km. or less, and leakage quantities of −40 db/meter or more can be obtained.

Furthermore, since the leakage waves are first shaped and concentrated by a first projector and then deflected by a second or third projector, superfluous leakage waves are reduced, and, moreover, interaction is also decreased. Thus, the waveguide of the invention is highly effective.

The present invention has further advantages such as the ease with which the projectors for concentrating leakage waves can be installed and the possibility of varying the radiation direction by selecting the incidence direction of electromagnetic waves. Accordingly the equipment and system according to the present invention are highly effective and useful in applications to communication for railways and transmission lines for obstacle detection.

We claim:

1. A microwave radiating and receiving device adapted to an apparatus for detecting the presence of an obstacle across a vehicle trackway, which comprises:

a cylindrical, leaky waveguide having a plurality of slots formed in its wall along the axial direction of the waveguide to capture and radiate leaked waves from an internal microwave transmitted in said waveguide through the slots, said waveguide being disposed along one side of a vehicle trackway to cause the leaked waves to traverse the trackway; and a reflector disposed on the other side of the trackway opposite to said one side confronting to the leaky waveguide so that the leaked wave which has traversed the trackway can be reflected back to the waveguide by said reflector when no obstacle exists on the trackway, thereby to generate a steady signal which can also be transmitted by said waveguide and recognized as an indication of absence of obstacle between the waveguide and the reflector.

2. A device according to claim 1 wherein said waveguide is provided with a plurality of deflectors, each being mounted in the vicinity of the slot with a specific interval pitch from adjacent deflectors and having a deflection face horizontally and vertically tilted with respect to the axis of the waveguide so that the leaked wave out of the slot is deflected by the deflectors horizontally over the trackway.

3. A device according to claim 2 wherein the specific interval pitch between the deflectors is made equal to integral multiples of the guide wavelength $\lambda_g$ of the mircowave transmitted by the waveguide.

4. A device according to claim 2 wherein horizontally and vertically tilted angles of each of the deflectors relative to the waveguide axis are determined to enable the leaked wave to be radiated at right angle from the waveguide axis, and said reflector is so disposed as to cause the leaked wave to re-enter into the waveguide.

5. A device according to claim 1 wherein said waveguide has horn projector means provided at the slot for restricting said leaked wave to have a sharp elongated flat radiation pattern, the outlet of said horn projector means confronting to the reflector so that the flat pattern of the leaked wave is produced in parallel to the trackway thereabove.

6. A device according to claim 5 wherein said waveguide is provided with a plurality of deflectors, each being mounted in the vicinity of the outlet of the horn projector means with a specific interval pitch from adjacent deflectors and having a deflection face horizontally and vertically tilted with respect to the axis of the waveguide so that the leaked wave out of the slot is deflected by the deflectors horizontally over the trackway.

7. A device according to claim 6, wherein the specific interval pitch between the deflectors is made equal to integral multiples of the guide wavelength $\lambda_g$ of the microwave transmitted by the waveguide.

8. A device according to claim 7, wherein horizontally and vertically tilted angles of each of said deflectors relative to the waveguide axis are determined to enable the leaked wave to be radiated at right angle from the waveguide axis, and said reflector is disposed at right angle to cause the leaked wave to re-enter into the waveguide.

9. A device according to claim 1, wherein said waveguide is disposed between two parallel vehicle trackways, and provided with two sets of deflectors, each deflector of the respective sets of the deflectors being mounted in the vicinity of the slot with a specific interval pitch from adjacent deflectors of the same set and horizontally and vertically tilted with respect to the axis of the waveguide so that the leaked wave out of the slot is deflected to both sides of the slots by the respective sets of the deflectors and radiates horizontally over the two trackways.

References Cited

UNITED STATES PATENTS

| | | | |
|---|---|---|---|
| 2,580,155 | 12/1951 | Brannen | 246—30X |
| 2,659,005 | 11/1953 | Gruenberg | 343—771X |
| 2,702,234 | 2/1955 | Korman | 246—30 |
| 3,137,001 | 6/1964 | Moran | 343—771X |
| 3,281,591 | 10/1966 | Takeya | 246—30X |
| 3,305,682 | 2/1967 | Bolster et al. | |
| 3,377,587 | 4/1968 | Nakahara et al. | 343—7 |

RODNEY D. BENNETT, JR., Primary Examiner

T. H. TUBBESING, Assistant Examiner

U.S. Cl. X.R.

246—30; 340—258; 343—771, 786